US012700887B1

(12) United States Patent
     Smith

(10) Patent No.:  US 12,700,887 B1
(45) Date of Patent:      Aug. 4, 2026

(54) MOBILE TELEPHONE CASE

(71) Applicant: Corey Smith, Houston, TX (US)

(72) Inventor: Corey Smith, Houston, TX (US)

( * ) Notice:  Subject to any disclaimer, the term of this patent is extended or adjusted under 35 U.S.C. 154(b) by 318 days.

(21) Appl. No.: 18/389,486

(22) Filed: Nov. 14, 2023

(51) Int. Cl.
     H04B 1/3888       (2015.01)
     H04M 1/04         (2006.01)

(52) U.S. Cl.
     CPC ............ H04B 1/3888 (2013.01); H04M 1/04 (2013.01)

(58) Field of Classification Search
     CPC ........ H04B 1/3888; H04M 1/04; H04M 1/02; H04M 1/725; H04M 1/7255; A45C 11/28; G03B 17/56; H04W 88/06
     See application file for complete search history.

(56)              References Cited

U.S. PATENT DOCUMENTS

| | | | | |
|---|---|---|---|---|
| 4,019,401 | A * | 4/1977 | Drone .................... | G05G 9/047 74/471 XY |
| 5,033,778 | A * | 7/1991 | Niles ....................... | E05C 19/14 206/387.1 |
| 7,040,675 | B1 * | 5/2006 | Ott ......................... | E05B 47/023 292/DIG. 43 |
| 8,777,002 | B2 | 7/2014 | Lonsdale, II et al. | |
| 9,369,170 | B2 * | 6/2016 | Sorrentino ........... | H04B 1/3888 |
| 11,451,258 | B2 | 9/2022 | Yu et al. | |
| 2007/0242948 | A1 | 10/2007 | Miramontes | |
| 2008/0213553 | A1 | 9/2008 | Hwang | |
| 2010/0062816 | A1 | 3/2010 | Yu | |
| 2011/0058255 | A1 | 3/2011 | Weiss | |

(Continued)

FOREIGN PATENT DOCUMENTS

| | | | | | |
|---|---|---|---|---|---|
| GB | | 2293458 | A * | 3/1996 | ............. G03B 17/04 |
| WO | WO-2009121401 | A1 * | 10/2009 | ............... H01H 3/46 |

OTHER PUBLICATIONS

OtterBox Amplify Glass Privacy Guard Screen Protector for iPhone 14 Plus and iPhone 13 Pro Max. Product Listing [online]. © 2023 Verizon [retrieved on Feb. 27, 2023]. Retrieved from the Internet: <URL: https://www.verizon.com/products/otterbox-amplify-glass-privacy-guard-screen-protector-iphone-14-plus-and-iphone-13-pro-max/?sku=sku5460712&cmp=CSE-C-HQ-NON-R-AC-NONE-NONE-2C0PX0-PX-BPA-77-91004&cmp=CSE_M_X_COE_BIN_ACCESS_99_99_PLA-6957&kpid=bi_cmp-416430065_adg-1228154725.

(Continued)

*Primary Examiner* — Charles N Appiah
*Assistant Examiner* — Sang Phuoc Le
(74) *Attorney, Agent, or Firm* — Cramer Patent & Design, PLLC.; Aaron R. Cramer

(57)              ABSTRACT

This disclosure details a protective case for mobile telephones aimed at safeguarding the front-facing camera from environmental hazards and impact without hindering device functionality. The case features a resilient body that secures the phone via a friction fit and a hinge-connected movable cover that can be positioned over the camera. The cover transitions between open and closed states, providing access to the camera when needed and protecting it when not in use. Apertures within the case align with the phone's speaker to ensure sound transmission is unobstructed. A control lever, connected via a center pin, enables smooth operation of the cover, moving through a rotational path that engages a linkage system to control the cover's motion. The case is versatile, designed to accommodate different phone models, and enhances the user experience by offering protection from elements like rain, dust, and sun glare while maintaining the phone's aesthetic and functional integrity.

2 Claims, 5 Drawing Sheets

(56)          References Cited

U.S. PATENT DOCUMENTS

2014/0326638 A1    11/2014  Webber
2015/0311941 A1*  10/2015  Sorrentino  ...........  H04B 1/3888
                                                                            455/575.8
2017/0005685 A1     1/2017  Kiser
2019/0260411 A1*    8/2019  Langhans  ...............  H04M 1/21
2020/0319530 A1*  10/2020  Vélez Justiniano  ....  A45C 11/00

OTHER PUBLICATIONS

Case Mate Allure Selfie Snap Case for Apple iPhone 6 / 6s / 7 / 8 / se. Product Listing [online]. Copyright © 1995-2023 eBay Inc. [retrieved on Feb. 27, 2023]. Retrieved from the Internet: <URL: https://www.ebay.com/itm/304568866667?hash= item46e9b8176b:g:1AwAAOSwR3xi1wji&amdata=enc% 3AAQAIAAABEAiu9ouISNeBOZGj2mpO%2FL4KUzbf3HBhDR B0sarRaARU167IRbOeV8zijS45lynjXCKH2IP9RP2IddKF7KTVE% 2FI11SU6qae5CP1Vp6KSKrZQqSoDNYorS0rvtTqJ0qIKCgxGMn nXRVx0u3f1mH%2F5ccCxVpe1M6nGVpdJT%.

* cited by examiner

MOBILE TELEPHONE CASE

RELATED APPLICATIONS

None.

FIELD OF THE DEVICE

The present device pertains generally to the field of protective accessories for electronic devices, and more specifically to a protective case designed for mobile telephones.

BACKGROUND OF THE DEVICE

In the ever-evolving domain of mobile technology, the protection of devices from everyday wear and tear and environmental factors has become increasingly important. Mobile telephones, in particular, are subject to a variety of damaging conditions, ranging from accidental drops to exposure to weather elements like rain, dust, and sun glare. Front-facing cameras on these devices are especially vulnerable as they are frequently utilized for capturing images and video calls and are typically exposed without any protective barrier. Existing protective cases offer limited solutions, often focusing on the general safeguarding of the device's body and screen, neglecting the specific needs of camera protection.

Moreover, users of mobile telephones desire protective measures that do not impede the functionality of the device, such as taking photographs or hearing audio clearly. Many protective cases on the market are either too bulky, obstruct camera lenses, muffle sound, or require the device to be removed from the case to fully utilize the camera, thereby exposing it to potential harm. Thus, there exists a need for an improved protective case for mobile telephones that provides a means to shield the front-facing camera when not in use and easily retracts when camera functionality is desired, all while allowing for the unimpeded use of the phone's features. The current device seeks to fulfill this need by introducing an innovative protective case with a movable cover for the front-facing camera, which is seamlessly integrated with the case design, providing both protection and convenience.

SUMMARY OF THE DEVICE

Embodiments of the present disclosure may include a protective case for a mobile telephone, which encompasses a protective case body. This body is configured to encase a mobile telephone by a friction fit. Additionally, embodiments may feature a movable cover attached to the protective case body via a hinge assembly. This movable cover is designed to selectively cover a front-facing camera of the mobile telephone.

In certain embodiments, the hinge assembly is configured to enable the movable cover to transition through a travel path from a closed position to an open position. The protective case body may incorporate one or more apertures aligned with the speaker of the mobile telephone, which permit sound transmission when the movable cover is in the closed position.

In some embodiments, the movable cover is composed of a hard material resistant to impacts. The hinge assembly might include a plurality of shell openings in the protective case body and a corresponding plurality of cover protrusions on the movable cover. These elements interact to facilitate a hinging motion.

The interaction between the shell openings and the cover protrusions can allow for ninety degrees (90°) of movement along the travel path. In some embodiments, the protective case features a control lever operatively connected to the movable cover, which governs the cover's movement through the travel path.

The control lever may be attached to the protective case body via a center pin, allowing for rotational movement along a designated travel path. The protective case may also include a linkage that connects the control lever to an activating arm of the movable cover, with two pivoting means connecting the linkage to both the control lever and the activating arm, respectively.

The movement of the control lever along the rotational travel path causes the linkage to move along a linear travel path, which in turn actuates the movable cover through its designated travel path. When in the open position, the movable cover defines an area of protection over the front-facing camera of the mobile telephone, configured to shield the camera from elements such as rain, sun glare, and dust.

The present disclosure also describes a method of using a protective case for a mobile telephone. This method includes providing a protective case as described, attaching the protective case to a mobile telephone by a friction fit, and manipulating a control lever to transition the movable cover from a closed to an open position. Utilizing the front-facing camera with the movable cover in the open position protects the camera from incidental weather events.

Manipulating the control lever involves rotating it along a rotational travel path, which, with the aid of a linkage and pivoting means, actuates the movable cover along the travel path. Post-usage, the movable cover can be returned to the closed position by manipulating the control lever in the opposite direction after using the front-facing camera.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
FIG. 1 is a perspective view of a mobile telephone case 10 having a movable cover 25, shown in a closed state, according to the preferred embodiment of the present device.
Figure 1:
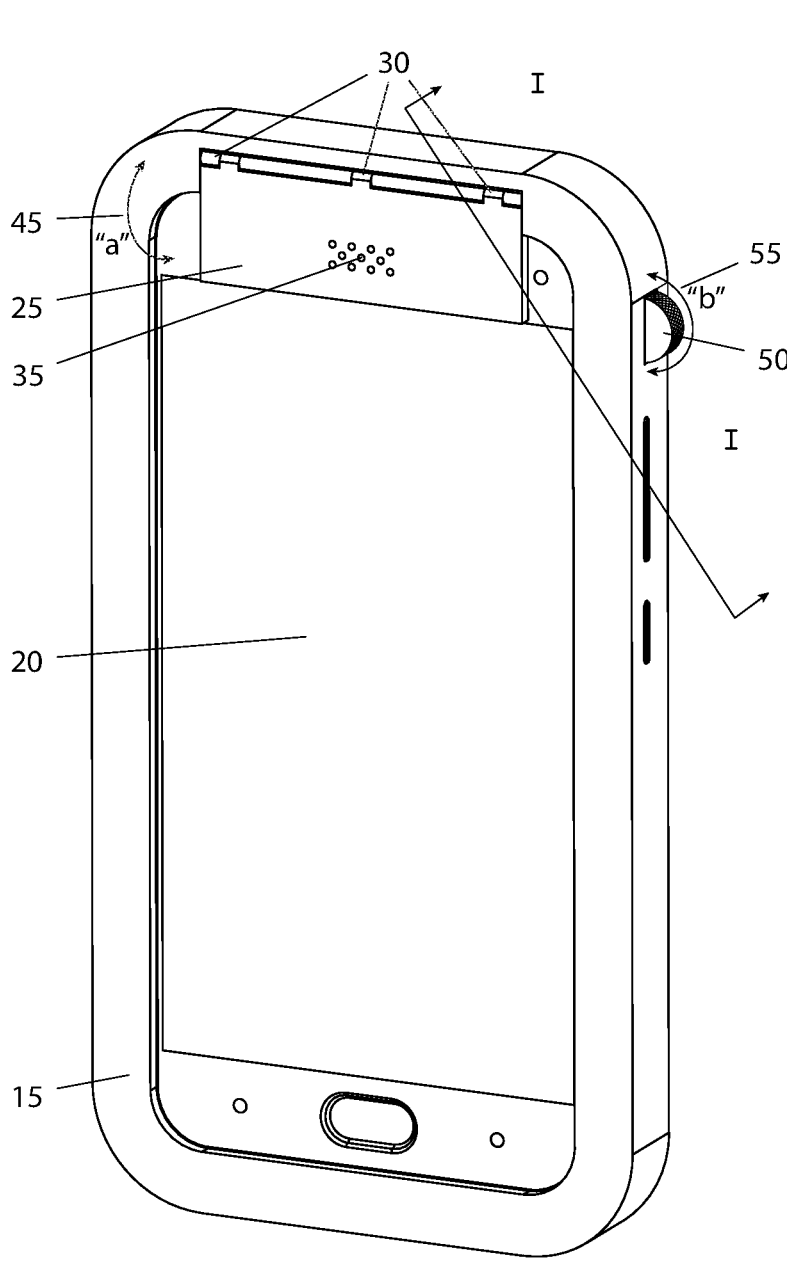

DESCRIPTIVE KEY 10 mobile telephone case
15 protective case body
20 mobile telephone
25 cover
30 hinge assembly
35 aperture 40 user
45 travel path "a"
50 control lever
55 travel path "b"
60 front-facing camera
65 area of protection
70 incidental weather event
75 rain
80 sun glare
85 dust
90 shell opening
95 cover protrusion
100 activating arm
105 center pin
110 linkage
115 pivoting means
120 travel path "c"

DESCRIPTION OF THE PREFERRED EMBODIMENTS

The best mode for carrying out the device is presented in terms of its preferred embodiment, herein depicted within FIGS. 1 through 5. However, the device is not limited to the described embodiment, and a person skilled in the art will appreciate that many other embodiments of the device are possible without deviating from the basic concept of the device and that any such work around will also fall under scope of this device. It is envisioned that other styles and configurations of the present device can be easily incorporated into the teachings of the present device, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the mobile telephone case 10 with a movable cover 25 shown in a closed state, according to the preferred embodiment of the present device is disclosed. The mobile telephone case (herein also described as the "case") 10, provides for a protective case body 15 having a deployable and retractable cover 25 for the front-facing (or "selfie") camera 60 to protect against adverse incidental weather events 70 such as rain 75, dust 85, and sun glare 80. The case 10 includes the protective case body 15 that encases an otherwise conventional mobile telephone 20. The protective case body 15 is capable of being attached to and providing a protective impact-resisting shell for the mobile telephone 20 by friction fit. As such, the protective case body 15 would be made available in multiple versions to fit all manufacturers, makes, and models of mobile telephones 20. The protective case body 15 would be made with multiple openings (not shown for illustrative simplicity) to align with various functional features of the mobile telephone 20 such as power buttons, volume buttons, microphone openings, rear camera openings, and the like. As such, the depiction of the protective case body 15 and mobile telephone 20 are generic in nature and not intended to illustrate all possible variations.

The use of the case 10 with any specific type of protective case body 15 is not intended to be a limiting factor of the present device.

Figure 2:
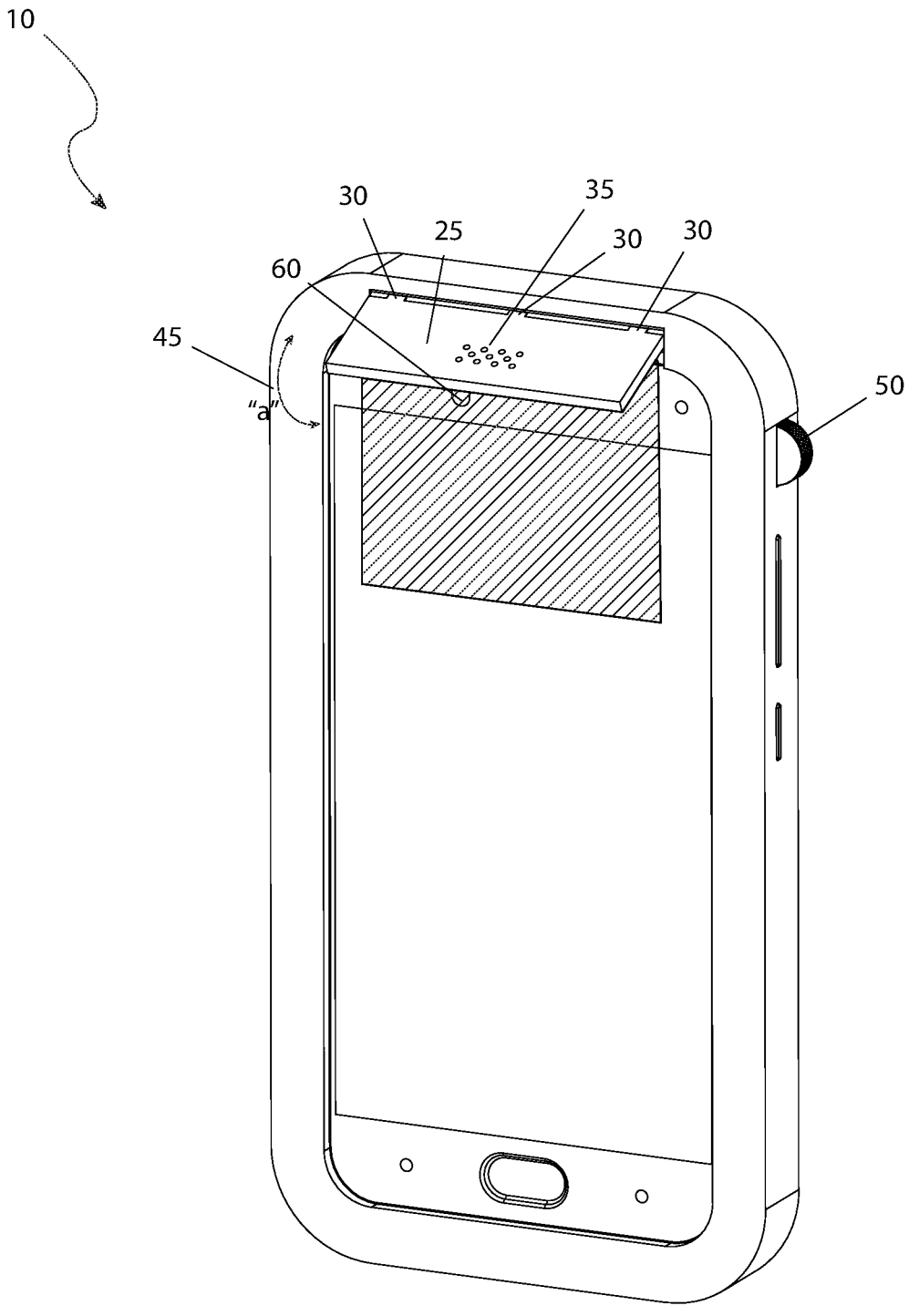
FIG. 2 is a perspective view of the mobile telephone case 10, where the cover 25 is shown in an open state, according to the preferred embodiment of the present device.

The upper portion of the protective case body 15 is provided with a cover 25 that covers the upper portion of the mobile telephone 20. The cover 25 is envisioned to be made of a hard material that withstands impacts, such as falling, without becoming dislodged. The cover 25 is attached to the protective case body 15 by use of a three-part hinge assembly 30 (which will be described in greater detail herein below). The cover 25 is also provided with a plurality of apertures 35 which will allow sound from the speaker of the mobile telephone 20, which may be located immediately underneath the apertures 35, to be emitted to allow hearing thereof by the user 40 (not shown in this figure). In its stowed or retracted position as shown, the cover 25 does not interfere with the use of the mobile telephone 20 and enables a user 40 of the mobile telephone 20 to operate other accessories such as styluses, automotive holders, holsters, being carried in a pocket or the like. The cover 25 moves through a ninety-degree (90°) travel path "a" 45 as governed by the hinge assemblies 30, from a closed state (as shown) to an open state (as shown in FIG. 2). This motion is controlled by a control lever 50 which moves along a rotational travel path "b" 55. Further detail on the configuration and operation of the cover 25 and control lever 50 will be provided herein below.

Referring next to FIG. 2, a perspective view of the case 10 where the cover 25 is shown in an open state, according to the preferred embodiment of the present device is depicted. The open state would be utilized when using the front-facing camera 60 or "selfie" camera (shown by dashed lines due to its hidden state). The cover 25 is positioned at the upper end of travel path "a" 45 as governed by the hinge assembly 30 and controlled by the control lever 50. The apertures 35 remain visible. The hinge assembly 30 produces an area of protection 65 against adverse incidental weather events 70 such as sun glare 80, rain 75, and dust 85. The front-facing camera 60 is fully within the area of protection 65 and is provided with the maximum level of protection.

Figure 3:
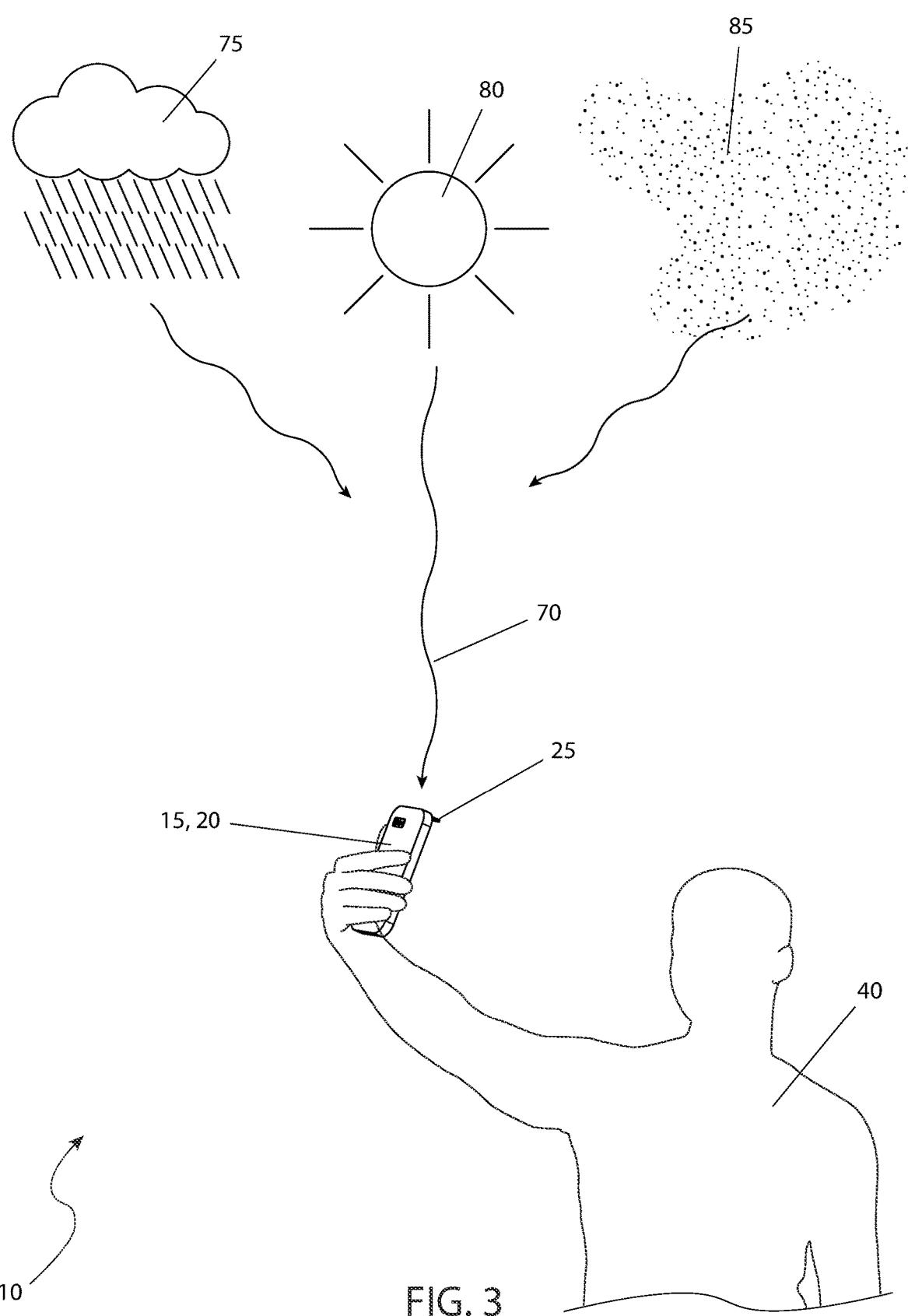
FIG. 3 is an environmental view of the mobile telephone case 10, where the cover 25 is shown in a utilized state, according to the preferred embodiment of the present device.

Referring now to FIG. 3, an environmental view of the case 10 where the cover 25 is shown in a utilized state, according to the preferred embodiment of the present device is shown. The user 40 would hold the protective case body 15 containing the mobile telephone 20 in an appropriate position to take a self-image ("selfie") of themselves, in a conventional manner. The cover 25 is deployed (as shown in FIG. 2) and produces the area of protection 65 over the front-facing camera 60 (both of which are as shown in FIG. 2). As such, any incidental weather event 70 such as rain 75, sun glare 80, and/or dust 85 is prevented from reaching the front-facing camera 60, and potentially ruining the capture image by the mobile telephone 20.

Figure 4:
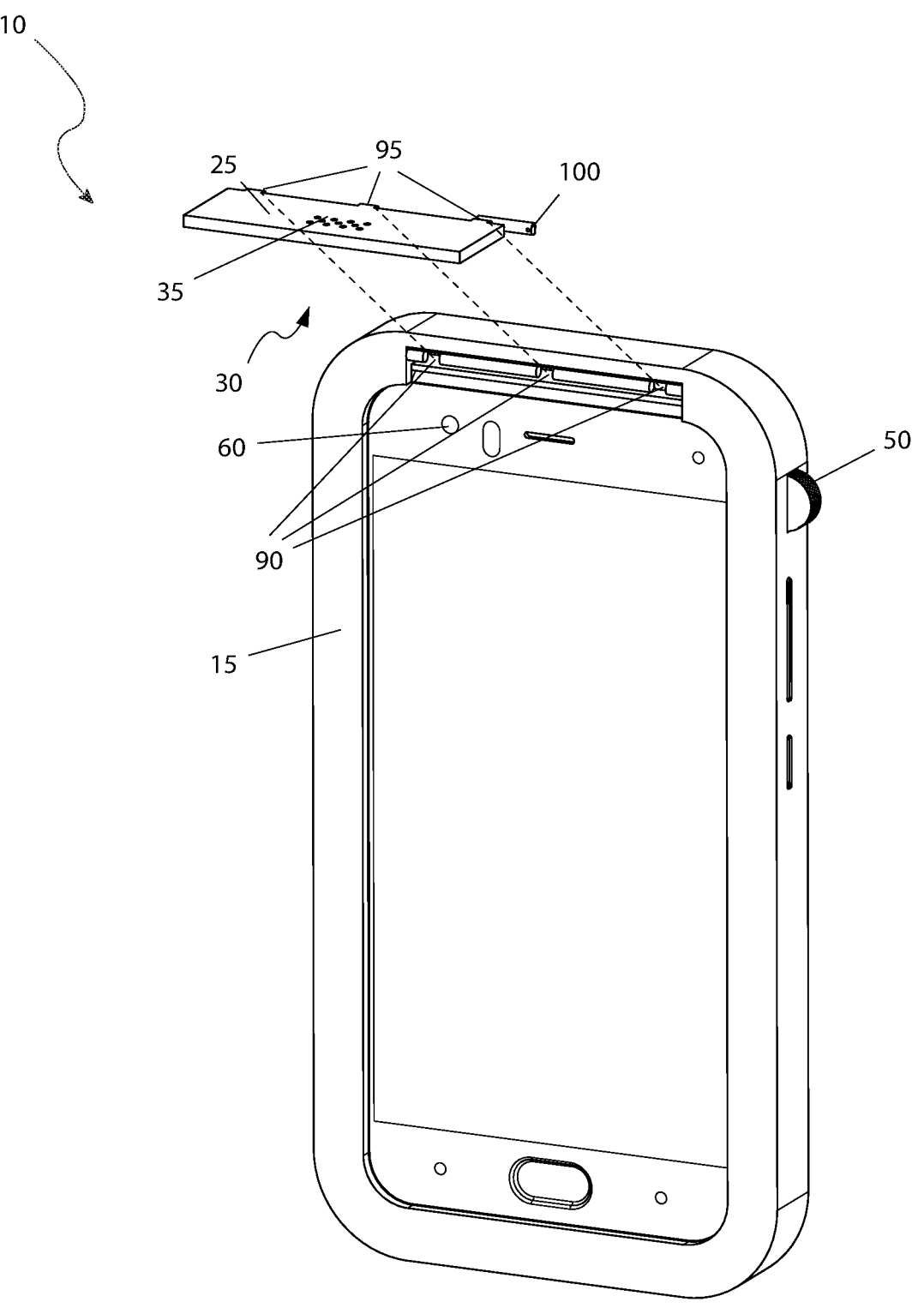
FIG. 4 is an exploded view of the mobile telephone case 10, according to the preferred embodiment of the present device; and, FIG. 5 is a sectional view of the mobile telephone case 10, as seen along a line I-I, as shown in FIG. 1, according to the preferred embodiment of the present device.

Referring next to FIG. 4, an exploded view of the case 10, according to the preferred embodiment of the present device is disclosed. For purposes of illustration, the cover 25 is removed from the protective case body 15. The hinge assembly 30 comprises three (3) shell openings 90 and three (3) cover protrusions 95, which when interconnected together by friction fit, produce a hinging action capable of ninety degrees (90°) of movement along travel path "a" 45 (as shown in FIGS. 1 and 2), and thus providing an area of protection 65 (as shown in FIG. 2) for the front-facing camera 60. The cover protrusion 95 nearest the control lever 50 is also provided with an activating arm 100 to assist in said motion as will be shown herein below.

Figure 5:
Figure 5:
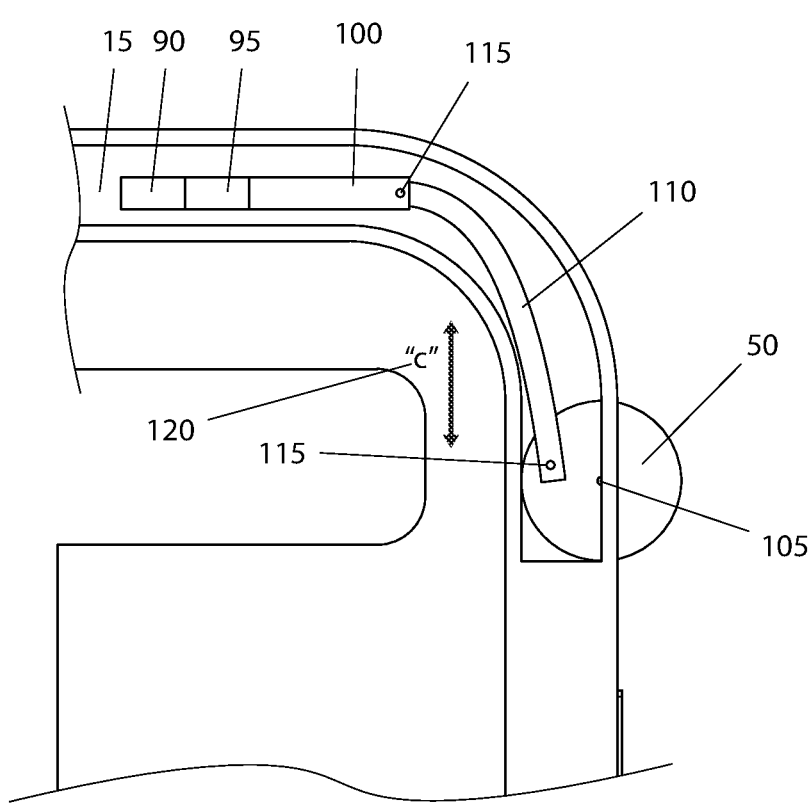

Referring to FIG. 5, a sectional view of the case 10, as seen along a line I-I, as shown in FIG. 1, according to the preferred embodiment of the present device is depicted. The control lever 50 is rotationally connected to the protective case body 15, preferably in an upper side location thereof, by a center pin 105, thus allowing the control lever 50 to move along travel path "b" 55 (as shown in FIG. 1). A linkage 110 is connected between the control lever 50 and the activating arm 100 by use of two (2) pivoting means 115, such as pins, rivets, screws, bearings, or the like. As the control lever 50 is moved along travel path "b" 55, the linkage 110 moves along a linear travel path "c" 120, thus acting upon the linkage 110 and producing travel path "a" 45 as seen in FIG. 1 that moves the cover 25 (not shown in this figure due to illustrative limitations) as restrained by the three (3) aligning and interacting sets of shell openings 90 and cover protrusions 95 (of which only one (1) set is shown due to illustrative limitations).

2. Operation of the Preferred Embodiment

The preferred embodiment of the present device can be utilized by the common user in a simple and effortless manner with little or no training. It is envisioned that the case 10 would be constructed in general accordance with FIG. 1 through FIG. 5. The user 40 would procure the case 10 from conventional procurement channels such as mobile telephone retailers, electronics stores, discount stores, mail order and internet supply houses and the like. Special attention would be paid to ensure that the case 10 chosen will fit the make and model of mobile telephone 20 upon which it is to be used.

After procurement and prior to utilization, with the cover 25 in an open (extended) position, as shown in FIG. 2, the protective case body 15 is firmly attached over the mobile telephone 20 in a conventional manner. The user 40 would then verify operation of the cover 25 via manipulation of the control lever 50 along the travel path "b" 55. At this point in time, the case 10 is ready for use.

During utilization of the case 10, should the user 40 wish to utilize the mobile telephone 20 without taking a self-image, or utilizing the front-facing camera 60, the cover 25 would be left in a down or retracted position, thus providing complete functionality of the mobile telephone 20, with the apertures 35 allowing sound to emanate from the protective case body 15.

Should the mobile telephone 20 wished to be used to take a self-image, or otherwise utilize the front-facing camera 60, the user 40 would manipulate the control lever 50 along travel path "b" 55, preferably with their thumb, to position the cover 25 in on open or extended manner as shown in FIG. 2. This will produce an area of protection 65 for the front-facing camera 60 against any incidental weather event 70 such as rain 75, sun glare 80, or dust 85. The self-image would be taken in an otherwise conventional manner from this point forward.

Once finished with any and all self-images, the cover 25 would be manipulated back to the closed or retracted position (as shown in FIG. 1) by opposite rotation of the control lever 50, thus readying the case 10 for repeated and cyclical usage.

The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A protective case for a mobile telephone, comprising:
a protective case body formed of a hard, impact-resistant material and configured to encase a mobile telephone by a friction fit;
a movable cover formed of a hard, impact-resistant material, the movable cover being positioned at an upper portion of the protective case body and being configured to selectively cover a front-facing camera of the mobile telephone, the movable cover comprising a plurality of apertures aligned with a speaker of the mobile telephone to permit sound transmission therethrough when the movable cover is in a closed position;
a hinge assembly attaching the movable cover to the protective case body, the hinge assembly comprising three shell openings formed in the protective case body and three cover protrusions formed on the movable cover, wherein the three cover protrusions are received within the three shell openings by friction fit to interconnect the movable cover to the protective case body and to produce a hinging motion, and wherein the hinge assembly is configured to allow the movable cover to move through a ninety-degree (90°) travel path from the closed position to an open position, wherein a first cover protrusion of the three cover protrusions that is positioned nearest to a control lever further comprises an activating arm;
the control lever rotationally connected to the protective case body by a center pin at an upper side location of the protective case body, the control lever being configured to move along a rotational travel path about the center pin to govern movement of the movable cover through the ninety-degree travel path; and,
a linkage connected between the control lever and the activating arm by a first pivoting means connecting the linkage to the control lever and a second pivoting means connecting the linkage to the activating arm, wherein movement of the control lever along the rotational travel path causes the linkage to move along a linear travel path, which in turn actuates the movable cover through the ninety-degree travel path from the closed position to the open position, and wherein movement of the control lever along the rotational travel path in an opposite direction causes the linkage to move along the linear travel path in an opposite direction to return the movable cover from the open position to the closed position; and,
wherein the movable cover, when in the open position, defines an area of protection over the front-facing camera of the mobile telephone configured to shield the front-facing camera from at least one of rain, sun glare, and dust.

2. The protective case of claim 1, wherein the first pivoting means and the second pivoting means each comprise at least one of a pin, a rivet, a screw, and a bearing.

* * * * *